United States Patent [19]
Timm

[11] Patent Number: 6,045,098
[45] Date of Patent: Apr. 4, 2000

[54] PERSONAL COMPUTER KEYBOARD SUPPORT HAVING MOVEABLE MOUSE EXTENSION

[75] Inventor: Derek Timm, Windsor, Calif.

[73] Assignee: Work-Rite Ergonomic Accessories, Inc., Novato, Calif.

[21] Appl. No.: 09/135,322

[22] Filed: Aug. 7, 1998

[51] Int. Cl.[7] .................................................. B68G 5/00
[52] U.S. Cl. ................ 248/118; 248/118.1; 248/346.01; 248/918
[58] Field of Search ........................... 248/118.1, 118.5, 248/118, 918; 400/715; 108/50.01, 50.02, 150; 312/208.1, 223.3

[56] References Cited

U.S. PATENT DOCUMENTS

| 5,242,139 | 9/1993 | Aldrich | 248/118 |
|---|---|---|---|
| 5,273,250 | 12/1993 | Pemberton et al. | 248/918 |
| 5,730,403 | 3/1998 | Johnson | 248/118.1 |
| 5,732,910 | 3/1998 | Martin | 248/118 |
| 5,803,416 | 9/1998 | Hanson et al. | 248/118 |
| 5,890,694 | 4/1999 | Possick | 248/550 |
| 5,901,934 | 5/1999 | Wilson | 248/346.01 |
| 5,915,655 | 6/1999 | Gutowski | 248/118.5 |
| 5,938,352 | 8/1999 | Chen | 400/472 |

*Primary Examiner*—Ramon O. Ramirez
*Assistant Examiner*—Walter Landry
*Attorney, Agent, or Firm*—Watts, Hoffmann, Fisher & Heinke, Co., L.P.A.

[57] ABSTRACT

A keyboard suppport includes a support body having a throughpassage that passes through the support body and opens on opposite sides of the support body. The support body also defines a support surface configured to accomodate a keyboard such as a keyboard for inputting alphanumeric symbols to a personal computer. A moveable mouse support fits within a portion of the throughpassage of the support and extends outwardly from the support to define a mouse support surface having a region that extends in front of a front edge of a keyboard with the keyboard resting the support surface. Although the term "mouse" has become almost universally used for the rolling input device used to move an arrow on the display screen and "pick" functions or data values, other terms such as "trackball" can be used interchangeably with the term "mouse".

30 Claims, 3 Drawing Sheets

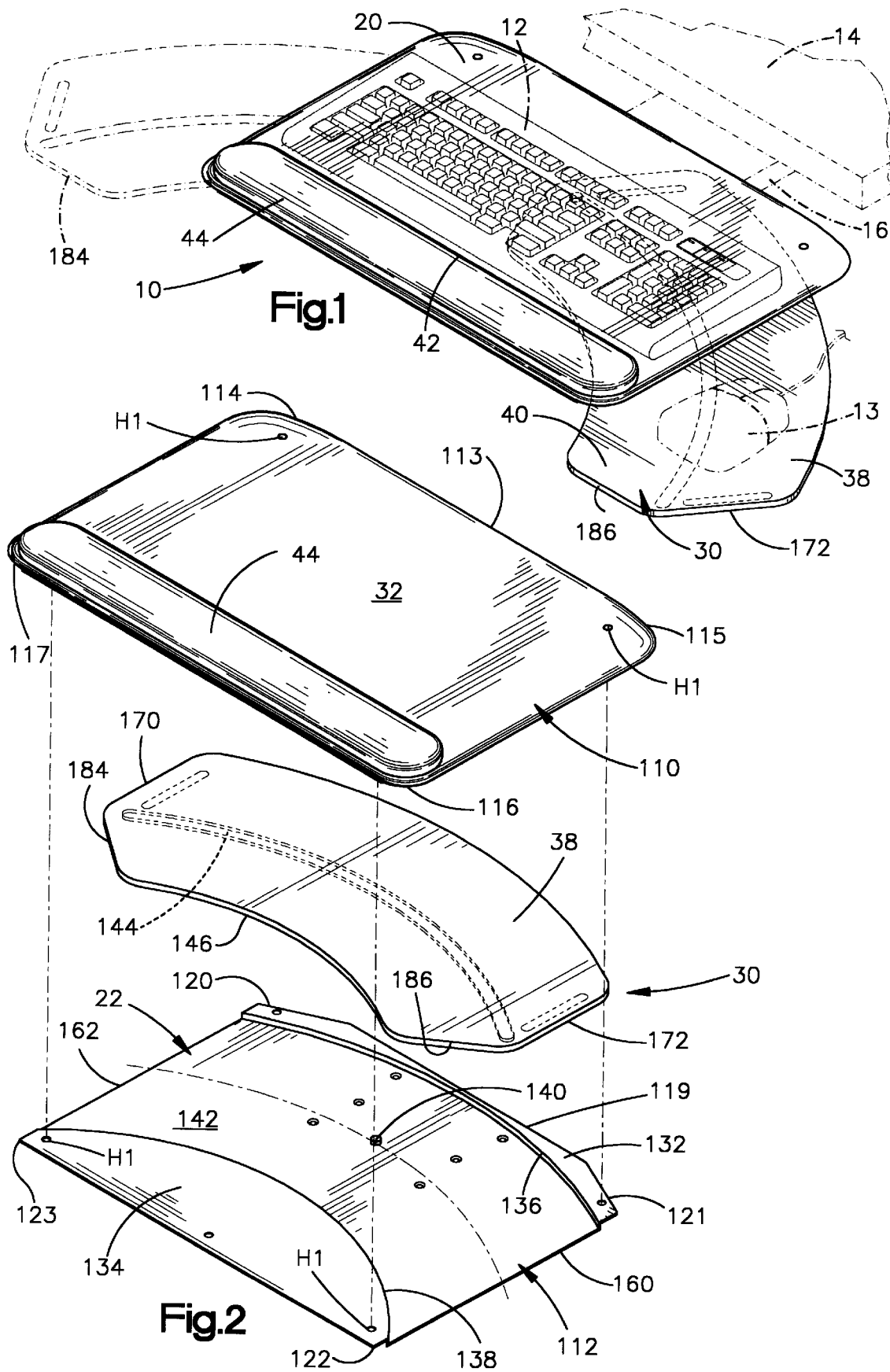

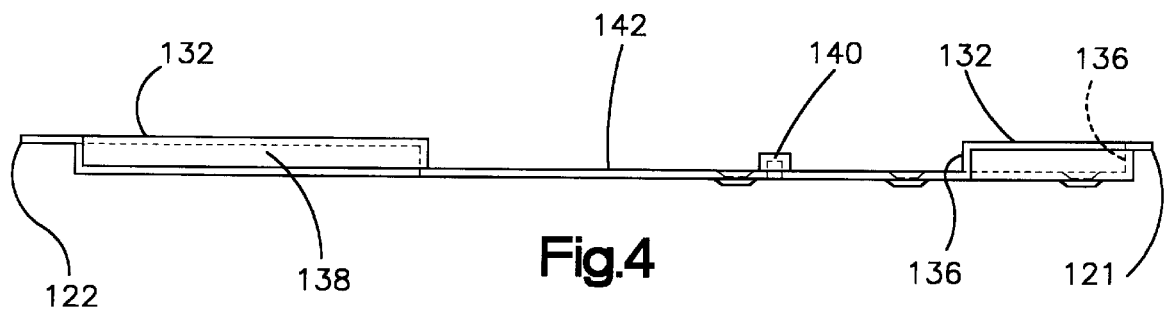
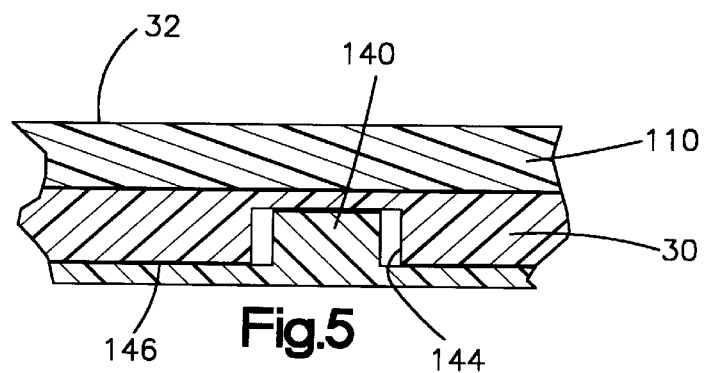
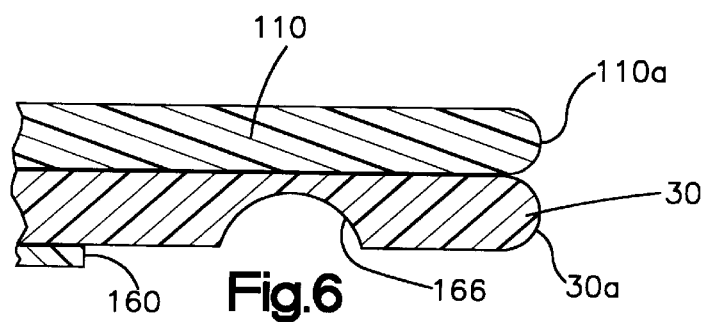

PERSONAL COMPUTER KEYBOARD SUPPORT HAVING MOVEABLE MOUSE EXTENSION

FIELD OF THE INVENTION

The present invention concerns a computer keyboard support having a movable extension that supports a data input device, such as a mouse, for controlling a cursor position on a computer viewing screen.

BACKGROUND ART

The personal computer revolution has placed personal computers and computer terminals on corporate and home desktops throughout the world. Almost all such computers and terminals allow data entry through an alphanumeric keyboard. Often such a keyboard rests on a level desktop surface which is the same as the surface that supports a computer base unit and a viewing monitor or screen.

Especially when the user must work at the computer for long periods of time, it is important to be able to adjust the position and/or orientation of the keyboard. Built in tabs that form an integral part of the keyboard allow for limited tilt adjustment. To allow more flexibility in positioning a keyboard to suit a user's ergonomic requirements, however, the keyboard needs its own support.

Different types of keyboard supports are sold by Work-Rite Ergonomics Accessories, Inc. the assignee of the present invention. One such keyboard support is moveably supported by a track and support mechanism that allows the keyboard to be moved out from under a user's desk and then stored beneath the desk when the keyboard is not in use. This keyboard support also allows the user to adjust both the angle and the height of the keyboard in relation to the user.

A common personal computer input device that has received wide acceptance is a two dimensional input control commonly referred to as a mouse. As the mouse is moved over a flat surface a roller that extends from a bottom of the mouse rotates and this rotation is translated into electrical signals that are transmitted to an interface of the personal computer. The movement of the mouse on the surface causes a corresponding movement of an arrow on the computer screen. By moving the arrow to point at a desired icon, function block, dialog box, or pull down menu, the user can actuate switches on the mouse to select or pick icons, or functions, actuate pull-down menus, select a block of text for editing, enter data, etc.

U.S. Pat. No. 5,655,743 to Gillis concerns a keyboard tray which is formed from two relatively shallow molded bodies united along a periphery to define a relatively flat, internal chamber through either of opposite side edges of the keyboard tray. A mouse tray can project outwardly of the internal chamber through either of opposite side edges of the keyboard tray.

SUMMARY OF THE INVENTION

One exemplary embodiment of the present invention concerns a keyboard support for a personal computer. The keyboard support includes a moveable support adapted to support a moveable pointer input device, such as a mouse. To accommodate the moveable support, the keyboard support includes a support body having a throughpassage that passes through the support body and opens on opposite sides of the support body. The moveable support is slidably positioned in the throughpassage. The support body defines a support surface configured to accommodate an alphanumeric keyboard for inputting signals corresponding to alphanumeric symbols to the computer.

The pointer device typically includes a roller that requires a generally flat surface for its support and rotation of the roller. Although the term "mouse" has become almost universally used for a moveable pointer input device, other terms such as "trackball" can be used interchangeably with the term "mouse".

The moveable support or moveable mouse support fits within a portion of the throughpassage of the keyboard support and can be extended outwardly from the keyboard support to define a mouse support surface. A portion of the mouse support extends in front of a front edge of a keyboard as the keyboard rests on the support surface.

The exemplary keyboard support includes a support body having a curved slot that extends through the support body. The keyboard support also includes a moveable mouse support that defines an arcuate body that fits within the curved slot of the support body and can be pushed back and forth through the curved slot to extend beyond one or the other side of the keyboard support body. Due to its curved or arcuate shape of the mouse support, an exemplary embodiment of the moveable mouse support defines a work region that extends beyond a front edge of the keyboard support body.

These and other objects, advantages, and features of the exemplary embodiment of the invention are described in detail in conjunction with the accompanying drawings.

BRIEF DESCRIPTION OF DRAWINGS

FIG. 1 is a perspective-view of a keyboard support and a mouse support constructed in accordance with an exemplary embodiment of the invention;

FIG. 2 is an exploded perspective view of the keyboard support of FIG. 1;

FIG. 4 is an end elevation view of a bottom piece of a keyboard support body;

FIG. 5 is a sectional view as seen from a plane indicated by the line 5—5 in FIG. 3; and FIG. 6 is a sectional view as seen from a plane indicated by the line 6—6 in FIG. 3

DETAILED DESCRIPTION OF AN EXEMPLARY EMBODIMENT

Figure 3:
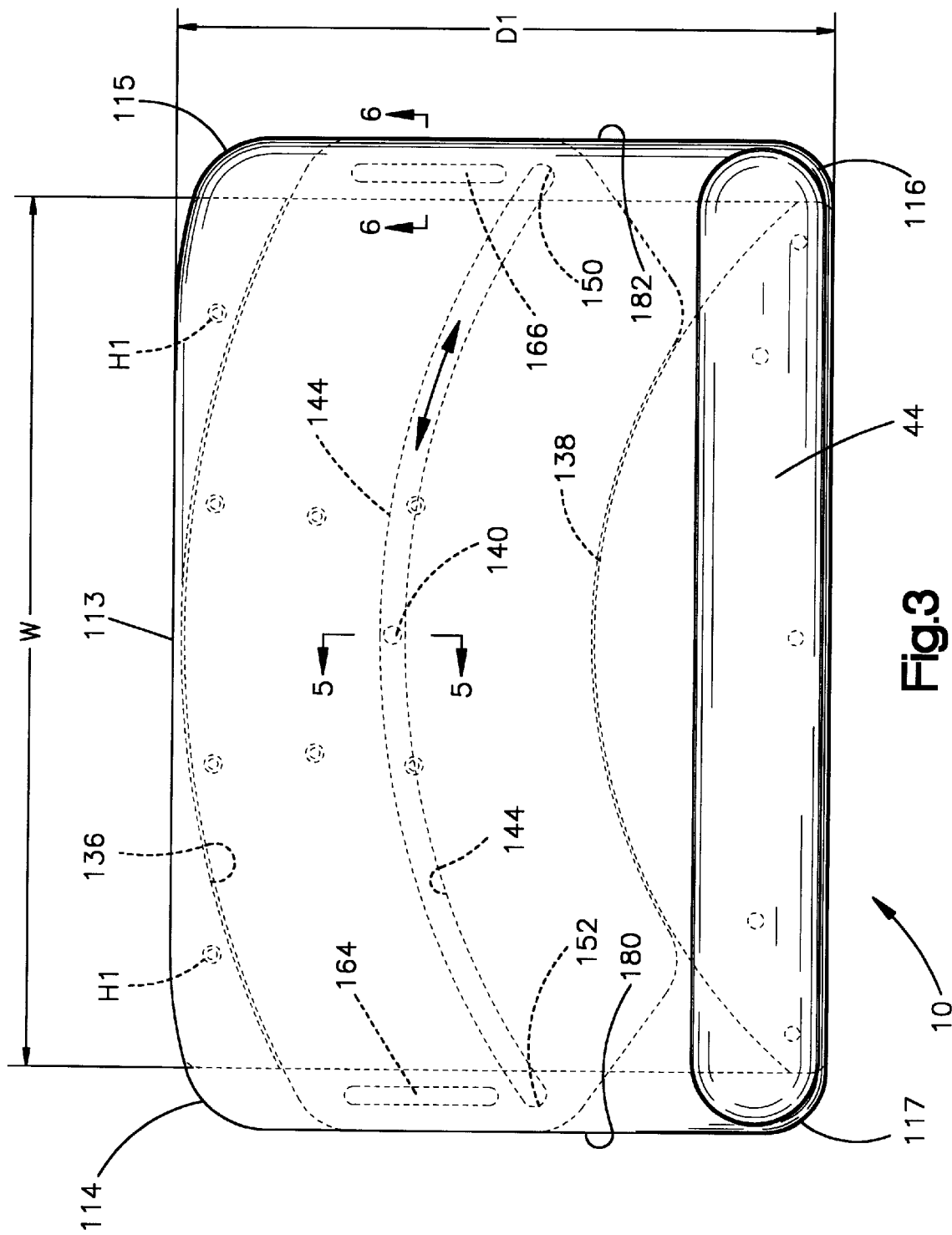
FIG. 3 is a top plan view of the keyboard support of FIG. 1.

Turning now to the drawings, FIG. 1 is a perspective view of a keyboard support 10 used to support a keyboard 12 and a mouse 13 in a position for typing and mouse controlled function selection and/or data entry. The keyboard 12 is typically coupled to a computer or workstation (not shown) resting on a desk (shown in dashed line at 14) for providing a working surface for a user. The keyboard support 10 may be mounted to a base that includes a retractable arm (shown in dashed line at 16) that extends out from beneath the desk 14 and allows the user to adjustably position the keyboard 12 relative to the desk 14.

The keyboard support 10 includes a support body 20 having a throughpassage 22 (FIG. 2) that defines a rack for a moveable mouse support 30. A top surface 32 of the support body 20 defines a support surface configured to accomodate the keyboard 12. The mouse support 30 fits within a portion of the throughpassage 22 of the support body 20 and can be moved to extend outwardly from the support body to define a mouse support surface 38 that extends to a region 40 (FIG. 1) in front of a front edge 42 of the keyboard 12 as the keyboard is resting on the keyboard support 10. A wrist support 44 extends above the supporting surface 32 and is attached to a front region of the support body. The wrist support 44 contacts a user's wrist as the user types at the keyboard 12.

The throughpassage 22 is a curved slot that extends through the support body 20. The mouse support 30 is an arcuate board-like member having the same radius of curvature so that it fits within the curved slot defined by the throughpassage 22. A position of the mouse support 30 relative the support body 20 is adjusted by pushing the mouse support 30 back and forth through the slot-shaped throughpassage 22. The mouse support 30 can be extended by the user to a position beyond one or the other side of the keyboard support 10 so that the curve of the arcuate mouse support body positions a work region defined by the mouse support 30 to either the left and foward of the keyboard 12 or to the right and forward of the keyboard 12. When in an intermediate or middle position, the mouse support 30 is hidden from view within the support body 20.

As seen in the exploded perspective view of FIG. 2, the keyboard support body 20 is made up of top and bottom body pieces 110, 112 that mate with each other along an outer periphery of the support body 20. A top piece 110 is generally rectangular in plan view. A forwardmost edge 113 of the top piece 110 extends between two rounded corners 114, 115 and a bottom edge 1 18 extends between two rounded corners 116, 117. A distance D1 (FIG. 3) from the top edge 113 to the bottom edge 118 of the top piece is about 13¼ inches in one exemplary embodiment of the invention. The top piece 110 defines the top support surface 32 on which the keyboard 12 is disposed.

As seen in the perspective view of FIG. 2, the bottom piece 112 also has two rounded corners 122, 123 and a forwardmost edge made up of three segments 119, 120, 121. The bottom piece defines the arcuate throughpassage or cutout 22 which accomodates back and forth movement of the mouse support 30. The cutout 22 is bound by front and rear raised segments 132, 134. The front raised portion 132 has a curved edge 136 that extends in an arc from a left side of the bottom piece 112 to a right side of the bottom piece 112. The curved edge 136 is generally symmetric about a centerline coincident with the line 5—5 of FIG. 3 passing through the bottom piece 112. The second or rear raised portion 134 defines a second edge 138 facing the curved edge 136. The front and rear raised portions 132, 134, confine the mouse support 30 to arcuate movement along a curved path of travel.

In accordance with an exemplary embodiment of the invention, the body piece 110 and the mouse support 30 are machined composite plastic (paper based phenolic) members. The bottom body piece 112 is a metal (steel) stamping having a thickness of about 0.073 inches. This metal stamping is deburred and painted prior to assembly of the support 10. A bottom surface of the top piece 110 rests against the raised portions 132, 134 of the bottom piece 112. Connectors (not shown) pass through aligned holes H1 in the two pieces 110, 112 to attach the two pieces together after the mouse support 30 has been positioned within the cutout 22.

As seen in the perspective view of FIG. 2, a pin 140 extends upwardly from a generally planar surface 142 of the curved cutout 22. The pin 140 forms a stop that limits the extent of movement of the mouse support. The mouse support 30 defines an arcuate slot 144 that extends up into a body of the mouse support 30 from a bottom surface 146 of that support. When assembled the pin 140 extends into the slot 144 as seen in the section view of FIG. 5. When the user pulls the mouse support 30 out from the keyboard support body 20 he or she is able to move the mouse support until the pin 140 butts against an end of the slot 144. In the configuration shown in FIG. 1, with the mouse support extending beyond the right hand side of the support 20 the pin 140 is butting against a right hand end 150 (FIG. 3) of the slot and with the mouse support 30 extending from the left hand side the pin 144 buts against the left hand end 152.

The bottom piece 112 of the support body 20 has a width W of about 17½ inches from the right edge 160 to the left edge 162. This is shorter than the width of the top piece 110 and allows the user to reach under the keyboard support and grasp the mouse support 30. In order to allow the user to more easily grasp the mouse support 30, the mouse support 30 defines two notches 164, 166 along two oppositely facing generally straight edge portions 170, 172 (FIG. 2) of the support 30. As seen in the plan view of FIG. 3 the straight edge portions 170, 172 generally align with opposite sides 180, 182 of the support 10 with the mouse support 30 in its hidden middle position. As seen in the perspective view of FIG. 1, beveled or angled edges 184, 186 of the mouse support 30 extend generally parallel to the front edge 42 of the keyboard and also extend in front of the front edge of the wrist support 44.

Edges of the top piece 110 and the mouse support 30 are exposed to contact by the user. As seen in the section view of FIG. 6, the top piece 110 and the mouse support 30 have rounded or contoured edges 110a, 30a respectively that extend around an outer periphery of those members.

While the present invention has been described with a degree of particularlity, it is the intent that the invention include all modifications and alterations from the disclosed design falling with the spirit or scope of the appended claims.

I claim:

1. Computer workstation apparatus comprising:
   a) a keyboard support including a support body having a throughpassage that passes through the support body and opens on opposite sides of the support body; said support body including a support surface configured to accommodate a computer keyboard, a front edge of the keyboard support including a straight portion; and
   b) a mouse support that fits within a portion of the throughpassage of the support body and extends outwardly from the support body to define a mouse support surface having a region that extends in front of outwardly extending portions of a vertical plane coincident with the straight portion of the front edge of the keyboard support and wherein no portion of the support body throughpassage extends in front of the vertical plane.

2. The workstation apparatus of claim 1 wherein the throughpassage of the keybaord support is a curved slot that extends through the support body and further wherein the mouse support defines an arcuate body that fits within the curved slot to be pushed back and forth through the slot to extend beyond one or the other side of the keyboard support so that the curve of the arcuate body positions a work region of the arcuate body in front of the keyboard support.

3. The computer workstation apparatus of claim 2 wherein the mouse support includes a slot and the support body includes a pin that fits into the slot to guide the mouse support during back and forth movement of the mouse support and to limit an extent of movement of the mouse support with respect to the support body.

4. The computer workstation apparatus of claim 3 wherein the support body comprises a top and a bottom member which contact along a peripery of the top and bottom pieces.

5. The computer workstation apparatus of claim 4 wherein the top and the bottom piece meet along a front and a back portion leaving gaps along sides of the suppport body that accomodate back and forth movement of the curved mouse support.

6. The computer workstation apparatus apparatus of claim 4 wherein the top member and the mouse support define rounded edge surfaces that face outwardly about an outer periphery of the top member and the mouse support.

7. The computer workstation apparatus of claim 2 wherein the support body is generally rectangular in plan and wherein the curved slot is generally symmetric about a centerline passing through a midpoint of the support body.

8. The computer workstation apparatus of claim 1 further comprising a wrist support that extends above the support surface and is attached to a front region of the body support.

9. The computer workstation apparatus of claim 8 wherein the wrist support is removable.

10. The computer workstation apparatus of claim 1 wherein the support body is adapted to be mounted to a base that includes a retractable arm.

11. A method of supporting a computer input device for controlled movement of the input device comprising the steps of:
  a) providing a support body having a curved passage that extends through at least a portion of the support body and opens outwardly from the support body; said support body including a support surface sized to accommodate a computer keyboard, a front edge of the support body including a straight portion;
  b) movably supporting a curved input device support within at least a portion of the curved passage in the support body; and
  c) moving the device support so that it extends outwardly away from the support body so that the curve of the input device support positions a part of the device support in front of outwardly extending portions of a vertical plane coincident with the straight portion of the front edge of the support body and wherein no portion of the support body throughpassage extends in front of the vertical plane.

12. The method of claim 11 further comprising the step of limiting an extent of device support movement along the arcuate travel path.

13. The method of claim 11 wherein the curved passage extends through the support body so that it extends outward from opposite sides of the support body and wherein the step of moving the device support comprises a step of moving the device support in either of two directions so that it extends out of one or the other side of the support body to provide a support surface on one or the other side of the support body.

14. Computer workstation apparatus comprising:
  a) a keyboard support including a support body defining a top surface for supporting a keyboard and including an elongated front edge facing a keyboard user as the user types on a supported keyboard, the front edge including a straight portion; and
  b) a mouse support attached to the support body and moveable from a stored position to an in use position that extends outwardly from the support body to provide a mouse support surface having a region that extends in front of outwardly extending portions of a vertical plane coincident with the straight portion of the front edge of the support body, the support body including a slot into which the mouse support fits in the stored position and from which the mouse support extends to define the in use position of the mouse support surface and wherein no portion of the support body slot extends in front of the vertical lane.

15. The computer workstation apparatus of claim 14 wherein the support body includes a stop and the mouse support includes a groove adapted to receive the support body stop for guiding the mouse support during back and forth movement of the mouse support and limiting movement of the mouse support within the slot.

16. The computer workstation apparatus of claim 15 wherein the slot defines an arcuate throughpassage to accommodate movement of the mouse support to extend from opposed sides of the support body for providing a mouse support surface on said opposed sides.

17. Computer workstation apparatus comprising:
  a) a keyboard support including a support body having an arcuate throughpassage that passes through the support body and opens on opposite sides of the support body; said support body including a support surface configured to accommodate a computer keyboard, a front edge of the keyboard support including a straight portion; and
  b) a curved mouse support having curved front and back edges that conform generally with bounding edges of the support body that define the arcuate throughpassage of the support body and adapted to be pushed back and forth through the arcuate throughpassage to extend beyond one side or the other side of the keyboard support such that one end portion of the mouse support defines a first mouse support surface extending beyond the one side of the keyboard support when the mouse support is pushed in a first direction and an opposite end portion of the mouse support defines a second mouse support surface extending beyond the other side of the keyboard support when the mouse support is pushed in a second direction, a portion of the one end of mouse support and a portion of the opposite end of the mouse support extending in front of outwardly extending portions of a vertical plane coincident with the straight portion of the front edge of the keyboard support and wherein no portion of the support body throughpassage extends in front of the vertical plane.

18. The computer workstation apparatus of claim 17 wherein the first and the second mouse support surfaces include regions that extend in front of a front edge of a keyboard on the keyboard support.

19. The computer workstation apparatus of claim 17 wherein the first and the second mouse support surfaces include regions that extend in front of a front edge of the support body.

20. The computer workstation apparatus of claim 17 further comprising a wrist support that extends above the support surface and is attached to a front region of the support body.

21. The computer workstation apparatus of claim 17 wherein the mouse support includes a slot and the support body includes a pin that fits into the slot to guide the mouse support during back and forth movement of the mouse support and to limit an extent of movement of the mouse support with respect to the support body.

22. The computer workstation apparatus of claim 17 wherein the support body is generally rectangular in plan and wherein the arcuate throughpassage is generally symmetric about a centerline passing through a midpoint of the support body.

23. The computer workstation apparatus of claim 17 wherein the support body comprises a top and a bottom member which contact along a periphery of the top and bottom pieces.

24. The computer workstation apparatus of claim 23 wherein the top and the bottom piece meet along a front and a back portion leaving gaps along sides of the support body that accommodate back and forth movement of the curved mouse support.

25. The computer workstation apparatus of claim 23 wherein the top member and the mouse support define rounded edge surfaces that face outwardly about an outer periphery of the top member and the mouse support.

26. A method of supporting a computer input device for controlled movement of the input device comprising the steps of:
   a) providing a support body having a curved passage that extends through at least a portion of the support body and opens outwardly from opposite sides of the support body; said support body including a support surface sized to accommodate a computer keyboard, a front edge of the support body including a straight portion;
   b) movably supporting a curved input device support within at least a portion of the curved passage in the support body; and
   c) moving the input device support in a selected one of first and second ways:
      1) the first way of movement of the input device support including the step of moving the input device support such that one end portion of the input device support defines a first support surface extending beyond a one side of the support body, the first support surface including a portion extending in front of outwardly extending portions of a vertical plane coincident with the straight portion of the front edge of the support body; and
      2) the second way of movement of the input device support including the step of moving the input device support such that an opposite end portion of the input device support defines a second support surface extending beyond an opposite side the support body, the second support surface including a portion extending in front of outwardly extending portions of the vertical plane and wherein no portion of the support body curved passage extends in front of the vertical plane.

27. The method of claim 26 further comprising the step of limiting an extent of input device support movement along a curved travel path.

28. Computer workstation apparatus comprising:
   a) a keyboard support including a support body having a throughpassage that passes through the support body and opens on opposite sides of the support body; said support body including a support surface configured to accommodate a computer keyboard;
   b) a mouse support that fits within a portion of the throughpassage of the support body and extends outwardly from the support body to define a mouse support surface having a region that extends in front of the keyboard support; and
   c) the mouse support including a slot and the support body includes a pin that fits into the slot to guide the mouse support during back and forth movement of the mouse support and to limit an extent of movement of the mouse support with respect to the support body.

29. The computer workstation apparatus of claim 28 the mouse support region extends in front of outwardly extending portions of a vertical plane coincident with the front of the keyboard support.

30. Computer workstation apparatus comprising:
   a) a keyboard support including a support body having an arcuate throughpassage that passes through the support body and opens on opposite sides of the support body; said support body including a support surface configured to accommodate a computer keyboard, the support body having a substantially planar lower surface adapted to be mounted to a base that includes a retractable arm; and
   b) a curved mouse support having curved front and back edges that conform generally with bounding edges of the support body that define the arcuate throughpassage of the support body and adapted to be pushed back and forth through the arcuate throughpassage to extend beyond one side or the other side of the support body such that one end portion of the mouse support defines a first mouse support surface extending beyond the one side of the keyboard support and in front of the keyboard support when the mouse support is pushed in a first direction and an opposite end portion of the mouse support defines a second mouse support surface extending beyond the other side of the keyboard support and ill front of the keyboard support when the mouse support is pushed in a second direction, the mouse support having a substantially planar upper surface.

* * * * *

UNITED STATES PATENT AND TRADEMARK OFFICE
CERTIFICATE OF CORRECTION

| | | |
|---|---|---|
| PATENT NO. | : 6,045,098 | |
| APPLICATION NO. | : 09/135322 | |
| DATED | : April 4, 2000 | |
| INVENTOR(S) | : Derek Timm | |

It is certified that error appears in the above-identified patent and that said Letters Patent is hereby corrected as shown below:

In the Claims

Claim 14, at Column 6, Line 9:

Replace "lane" with --plane--

Signed and Sealed this
Eighteenth Day of November, 2014

Michelle K. Lee
*Deputy Director of the United States Patent and Trademark Office*